United States Patent [19]

Orta et al.

[11] 4,352,461

[45] Oct. 5, 1982

[54] HAND SIGNALS

[76] Inventors: Phillip N. Orta, c/o George Spector, 3615 Woolworth Bldg., 233 Broadway; George Spector, 3615 Woolworth Bldg., 233 Broadway, both of New York, N.Y. 10007

[21] Appl. No.: 148,578

[22] Filed: May 9, 1980

[51] Int. Cl.³ .............................................. B60R 15/00
[52] U.S. Cl. .................................. 239/211; 116/28 R; 222/78; 239/329; 428/31; 428/181; 428/905
[58] Field of Search ......................... 40/593, 597, 613; 116/28 R; 222/78, 174; 239/34, 54, 55, 57, 211; 248/206 R, 467; 428/31, 905, 181; 150/0.5

[56] References Cited

U.S. PATENT DOCUMENTS

| | | | |
|---|---|---|---|
| D. 234,583 | 3/1975 | Ehrlich | D10/109 |
| 1,629,400 | 5/1927 | Lovejoy | 428/31 X |
| 1,930,164 | 10/1933 | Fletcher | 428/31 X |
| 1,975,765 | 10/1934 | Brennan | 428/31 X |
| 2,690,094 | 9/1954 | Becker | 428/31 X |
| 3,070,919 | 1/1963 | Peckham | 116/28 R X |
| 3,237,330 | 3/1966 | Dinstbir | 116/28 R X |
| 3,409,167 | 11/1968 | Blanchard | 150/0.5 X |
| 4,093,165 | 6/1978 | Sussman | 248/206 R X |
| 4,106,698 | 8/1978 | Lin | 239/34 |
| 4,149,675 | 4/1979 | Van Breen et al. | 239/57 X |

FOREIGN PATENT DOCUMENTS 527868  6/1955  Italy .................................. D11/104

*Primary Examiner*—Henry F. Epstein

[57] ABSTRACT

An air freshener device mountable inside an automotive vehicle for the purpose of refreshing the vehicle air breathed by the vehicle occupants, the device including a hand-shaped container oscilated on a flexible rod attached to a suction cup mountable on the vehichel dashboard, and small dispensing openings at a top of the container so to allow a fine vapor of an air refreshing liquid being dispensed from the container.

2 Claims, 4 Drawing Figures

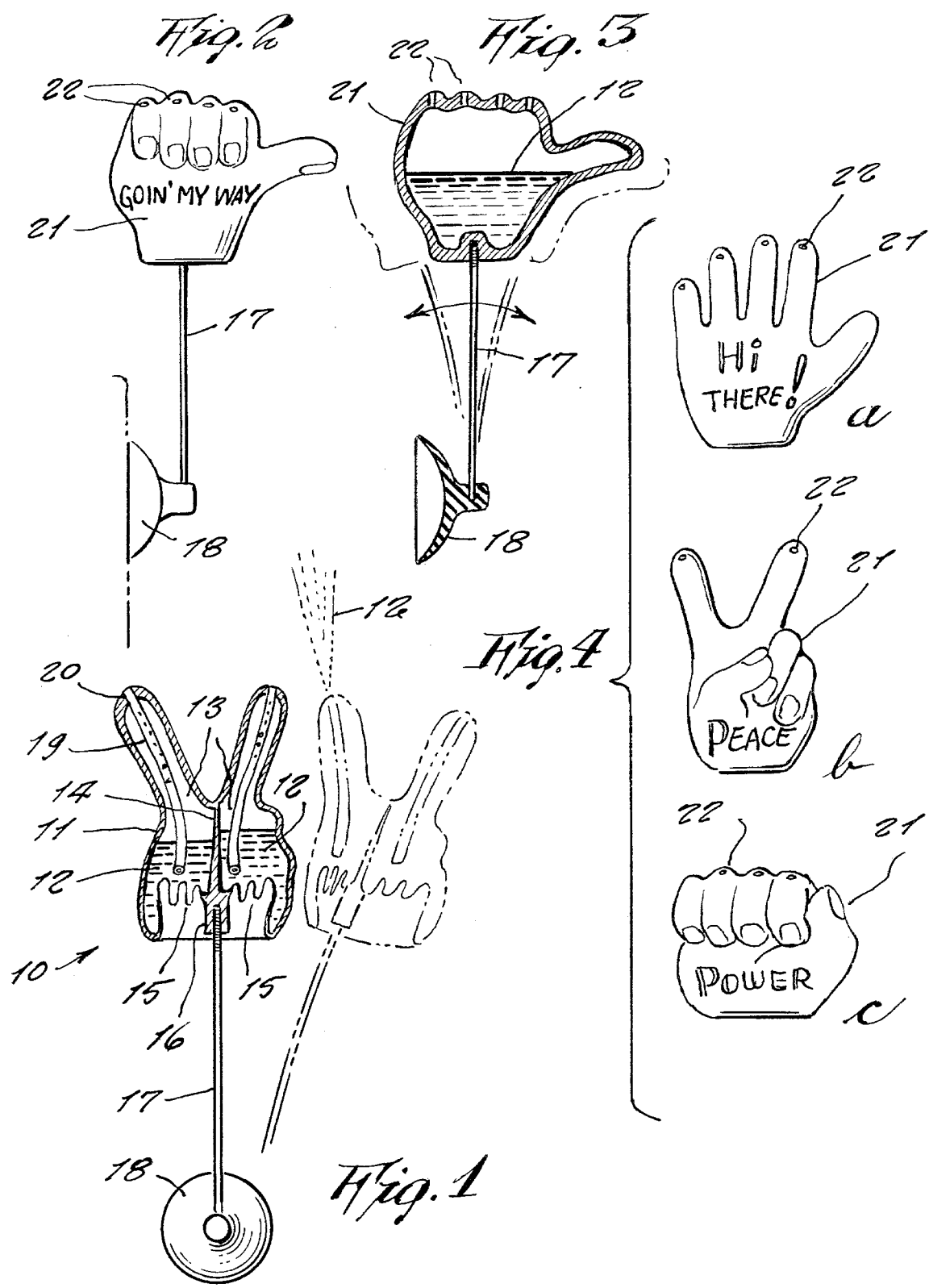

HAND SIGNALS

This invention relates generally to air refreshing devices.

It is well known that many motorists carry car fragrances in a little container suspended by a string from the interior rear view mirror so that fragrance is dispensed therefrom into the vehicle air. However such containers dangling in front of the windshield obstruct a front view so are not ideal.

A principal object of the present invention is to provide a fragrance dispenser that is elsewhere mounted on the vehicle so that it is out of a way while dispensing fragrance to the car interior.

Another object is to provide an air freshener device in which the fragrance container is in a shape of a hand in any of various different positions, so that a purchaser can select any one thereof that will appeal to him.

Still another object is to provide an air freshener device while oscillates as the vehicle travels so to pump the fragrance into the air.

FIG. 1 is a side cross sectional view of a fragrance container mounted upon a support that is attachable by a suction cup inside the car, the container being designed to automatically spray a fragrance is the container is swayed by the moving vehicle.

FIG. 2 is a front view of another design of container mounted on the support.

FIG. 3 is cross sectional view thereof.

FIG. 4a, 4b and 4c are front views of several other designs of fragrance containers, the container shown at being a same design as that shown in FIG. 1 with two raised fingers.

Referring now to the drawing in greater detail, and more particularly to FIG. 1 thereof, the reference numeral 10 represents an air refreshener device according to the present invention wherein there is a plastic container 11 containing liquid air refreshener 12 inside two compartments 13 separated by a relatively stiff, upwardly thinning partition 14. A lower wall 15 of each compartment is corrugated, forming an accordion pleated wall as shown. The lower end of the partition is attached to the walls 15 and is integral with a downward stem 16 that fits on an upper end of a flexible thin rod 17 which at its lower end is mounted on a suction cup 18 which can be attached to any smooth surface inside a car, such as on a dashboard. A flexible, perforated hose 19 from a top opening 20 of each compartment extends down into the liquid refreshener 12.

In operative use, as the vehicle travels, the vehicle motion causes the rod to swing with the weight of the container 11 thereupon.

This causes the container to oscillate from side to side so that the flexible, accordion pleated bottom wall 15 of one compartment is stretched and the other compartment bottom wall is contracted, as the container sways reciprocally in opposite directions on the partition. This action causes reciprocal volume changing in each compartment so that liquid vapors from the freshener 12 moves up outward of the perforated hoses and into the car air.

Reference is now made to FIGS. 2 through 4, which shows a modified design of the invention. Each container 21 is in the shape of a hand in different poses. Thus in FIG. 1, the hand is in a pose of that of a hitch hiker, whereas in FIG. 4, a hand "a" is in a position of a greeting, a hand "b" is in a position with two fingers extended upward in a V-shape so to represent Peace, while a hand "c" shows a clenched fist representing Power. The hand shown at "b" is the one used in the cross section illustrated in FIG. 1.

As shown in FIG. 3, the hand shaped containers may alternately be made without the pumping feature of FIG. 1, the container illustrated in FIG. 3, simply comprising a cloud bottle with a non-flexible, same thickness wall all around. Several perforated openings 22 at a top of each container allow refreshener vapors to be dispensed outward as the container sways freely on the rod 17.

While various changes may be made in the detail construction, it is understood that such changes will be within the spirit and scope of the present invention as is defined by the appended claims.

What is claimed:

1. An air refreshner device adapted for vibratory mobile mounting on the interior of an automotive vehicle comprising a container with a message thereon mounted at the top of a vibratory flexible rod which at its lower end is mounted on a suction cup, a liquid air refreshner inside said container and a plurality of openings at an upper end of said container for dispensing vapor from said refreshener outwardly of said container in combination with means responsive to rod vibration for pumping vapor through said openings, said container being hand shaped wherein the said means comprises a flexible bottom wall of said container secured centrally to said rod whereby vibratory rod movement causes alternating contraction and expansion of the container volume resulting in increased vapor outflow from said container wherein said container is divided by a central partition into two compartments each having an accordion pleated bottom wall at each side of said partition, said rod being connected to said partition.

2. A device as in claim 1 wherein said hand includes separated fingers each finger having an outlet to the exterior communicating with each compartment.

* * * * *